Figure 1:
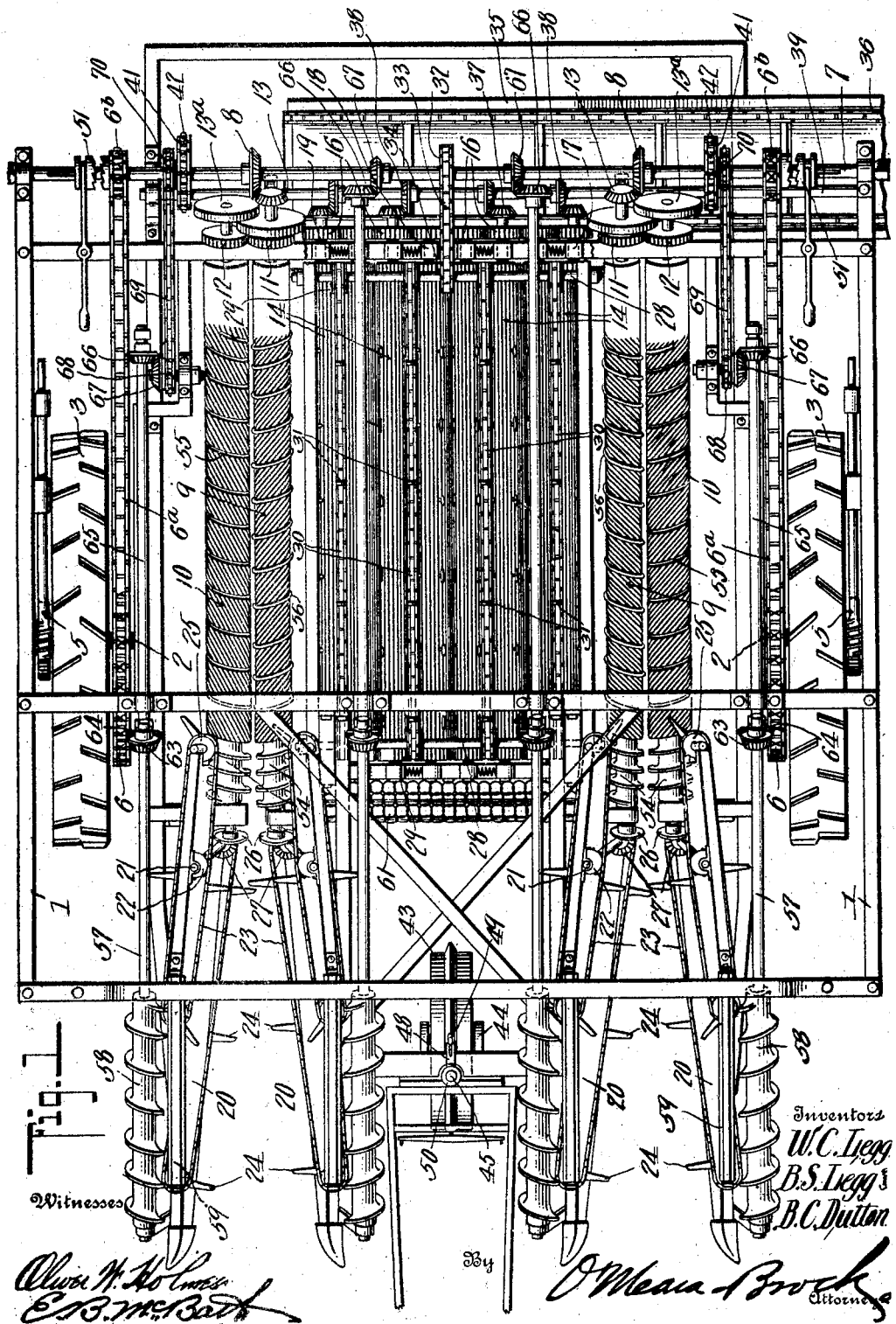

W. C. & B. S. LEGG & B. C. DUTTON.
CORN SNAPPING AND HUSKING MACHINE.
APPLICATION FILED NOV. 27, 1907.

1,002,530.

Patented Sept. 5, 1911.

6 SHEETS—SHEET 1.

Witnesses

Inventors
W. C. Legg,
B. S. Legg,
B. C. Dutton
By
Attorneys

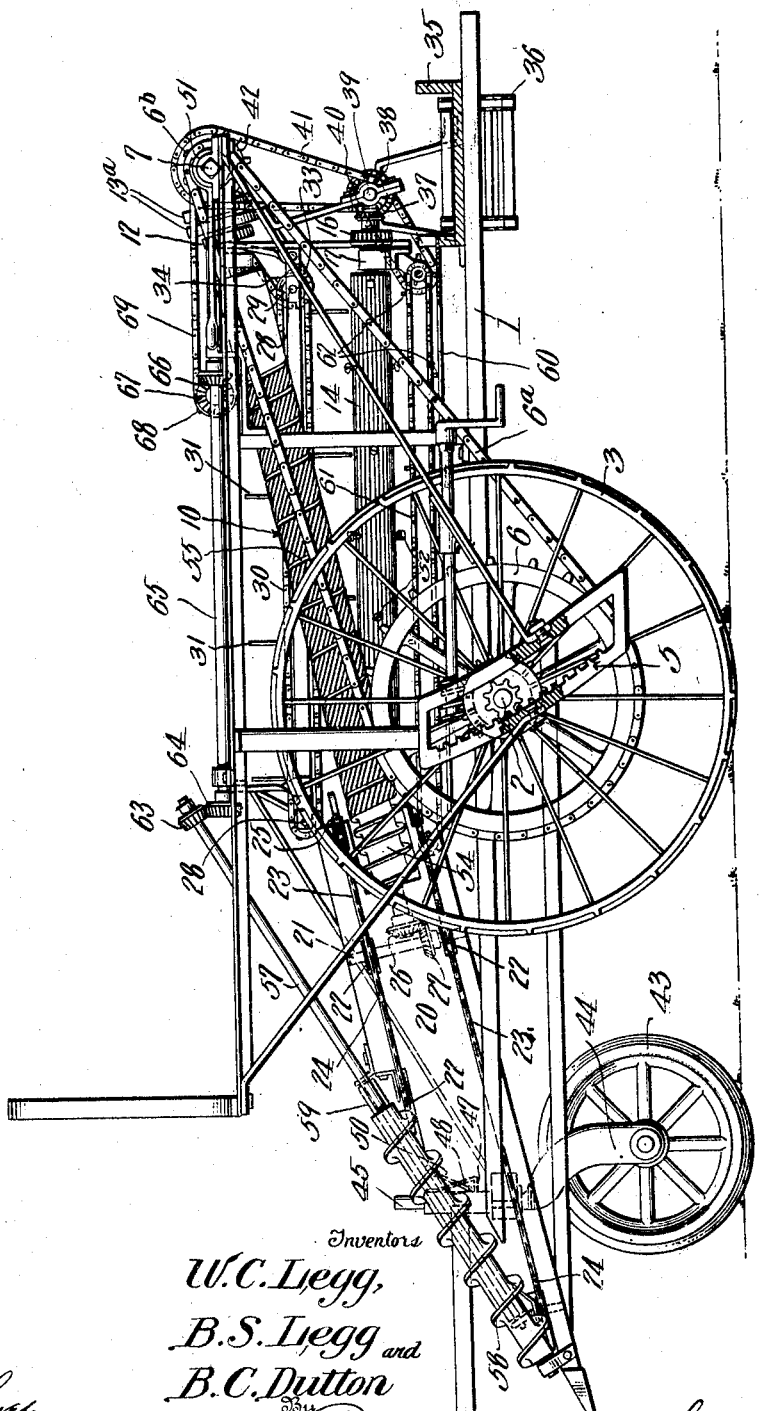

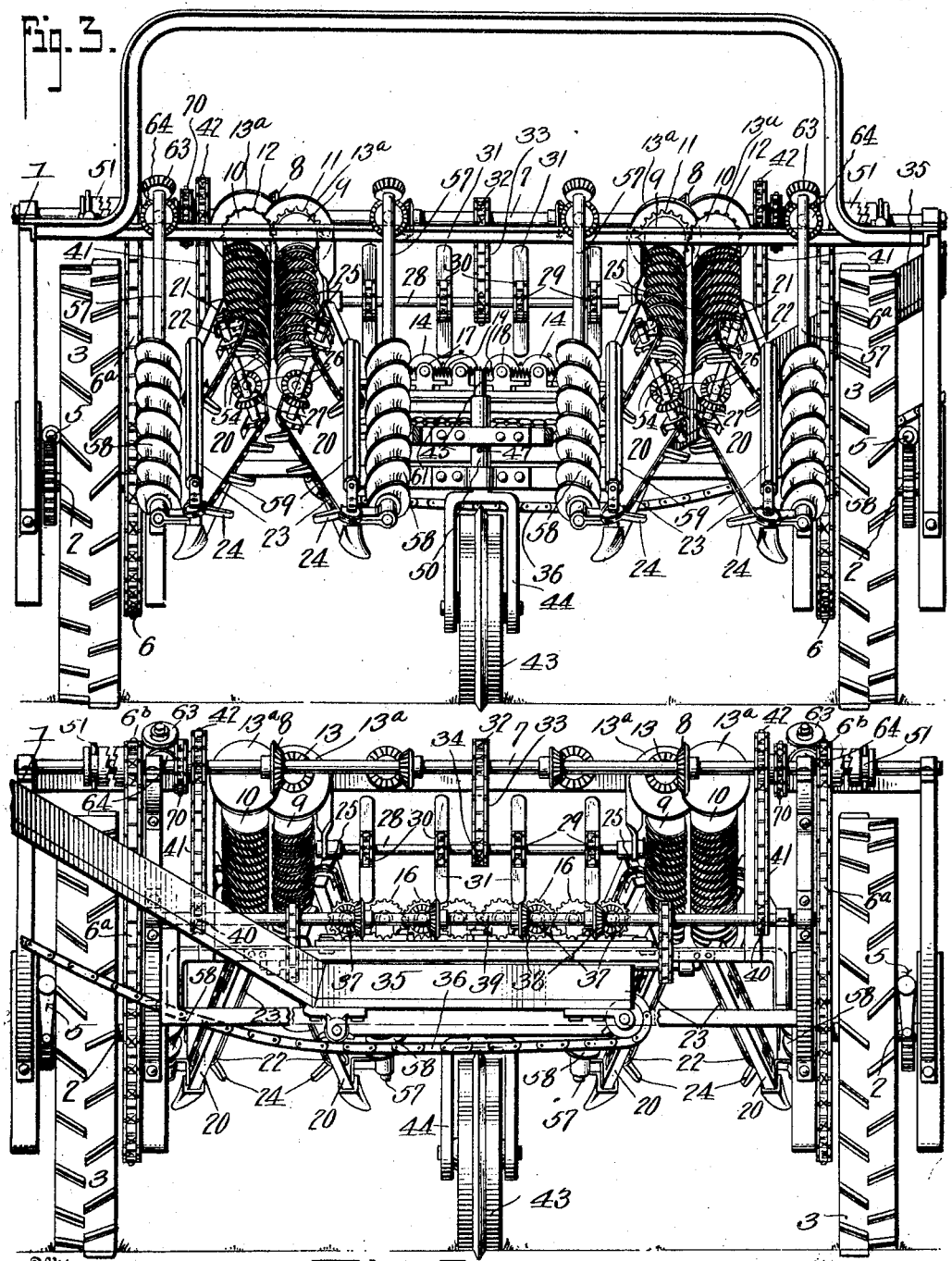

W. C. & B. S. LEGG & B. C. DUTTON.
CORN SNAPPING AND HUSKING MACHINE.
APPLICATION FILED NOV. 27, 1907.
1,002,530.
Patented Sept. 5, 1911.
6 SHEETS—SHEET 4.
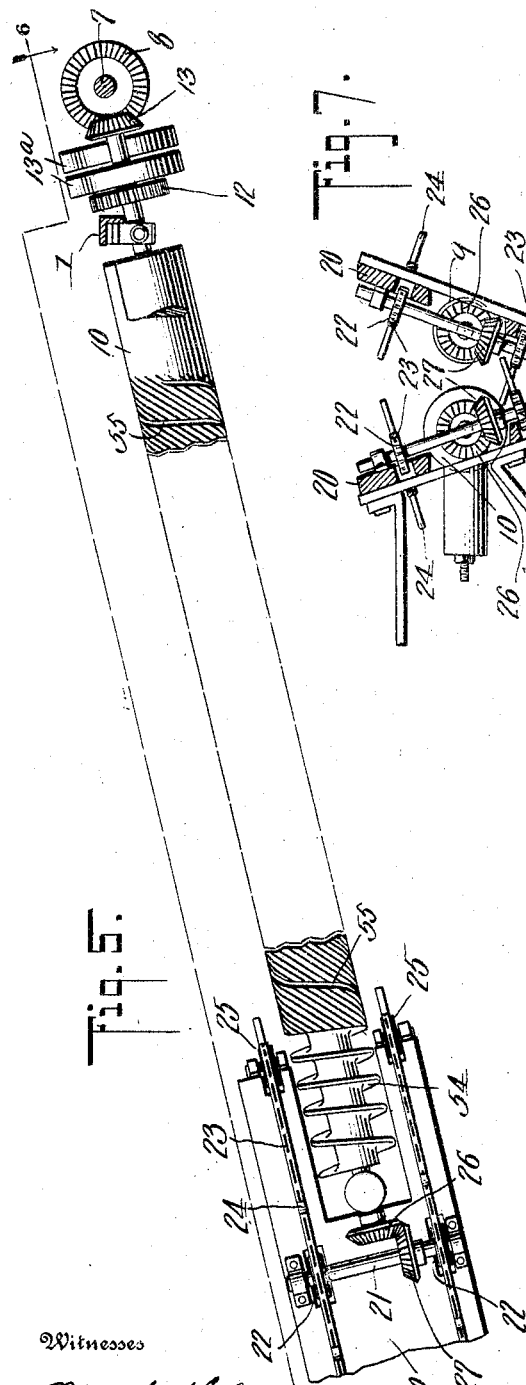
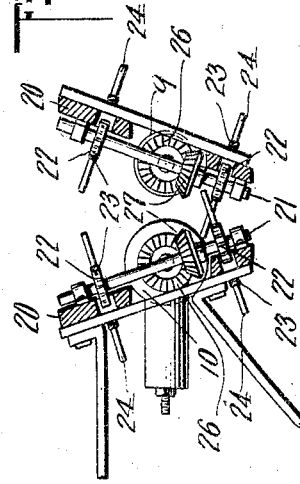
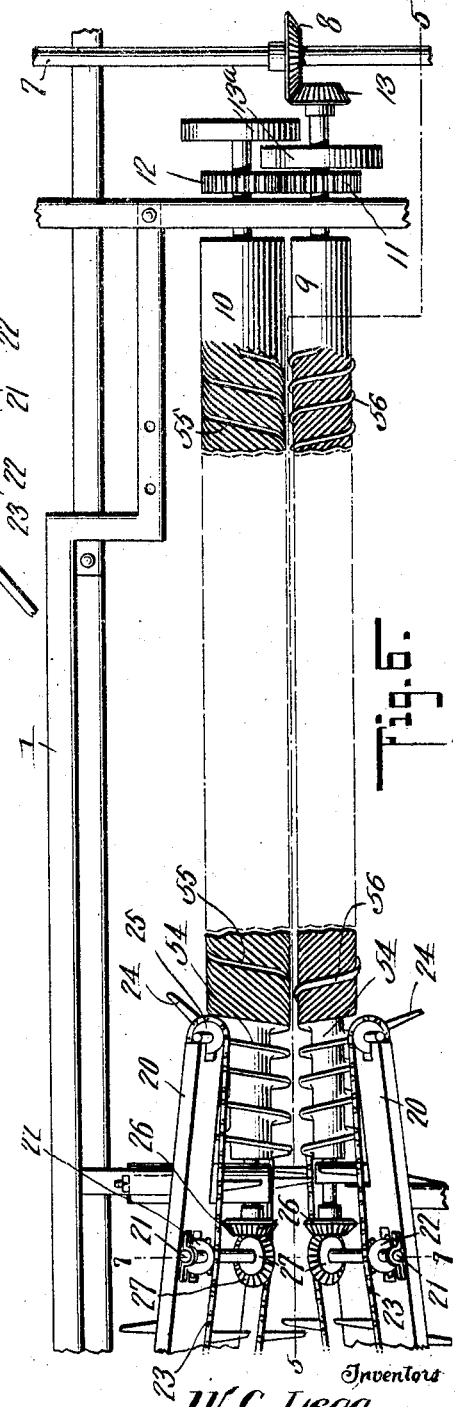
Witnesses
Olive H. Holmes
E. B. McBath
Inventors
W. C. Legg,
B. S. Legg, and
B. C. Dutton
By
Attorneys

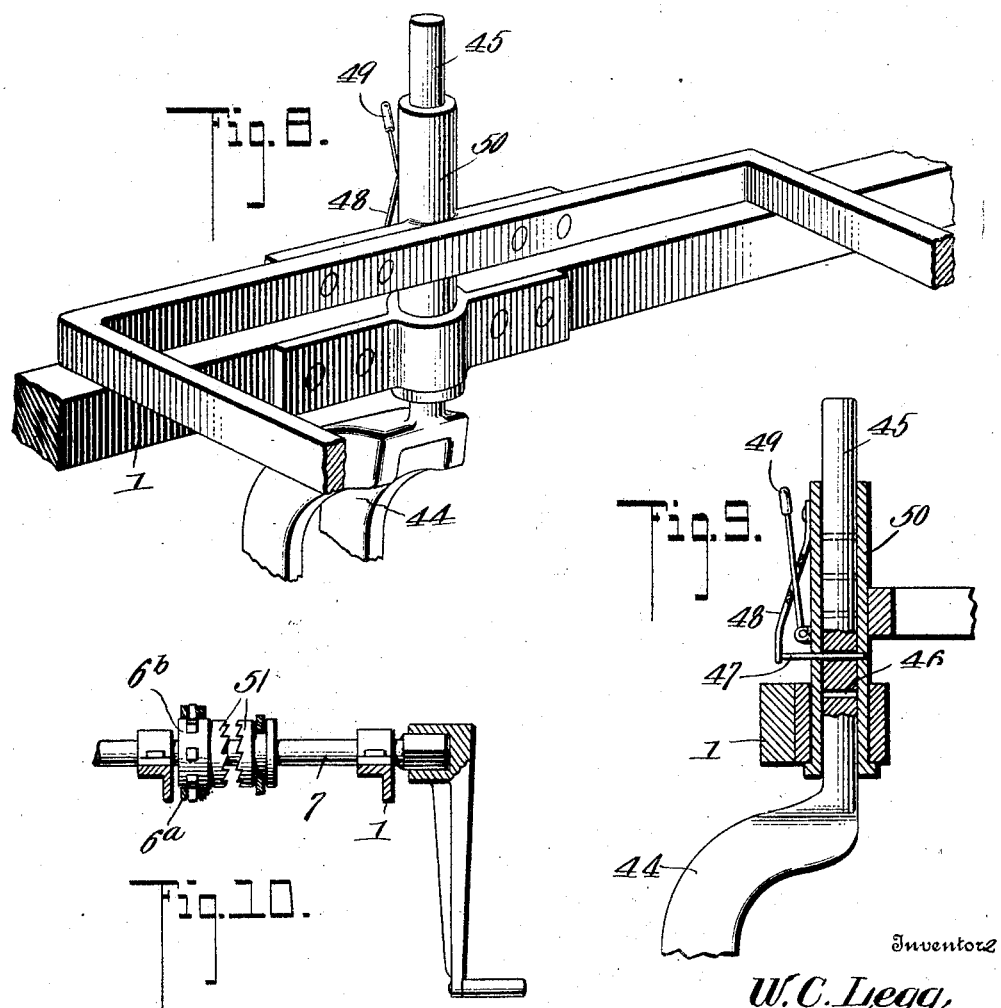

W. C. & B. S. LEGG & B. C. DUTTON.
CORN SNAPPING AND HUSKING MACHINE.
APPLICATION FILED NOV. 27, 1907.
1,002,530.
Patented Sept. 5, 1911.
6 SHEETS—SHEET 6.
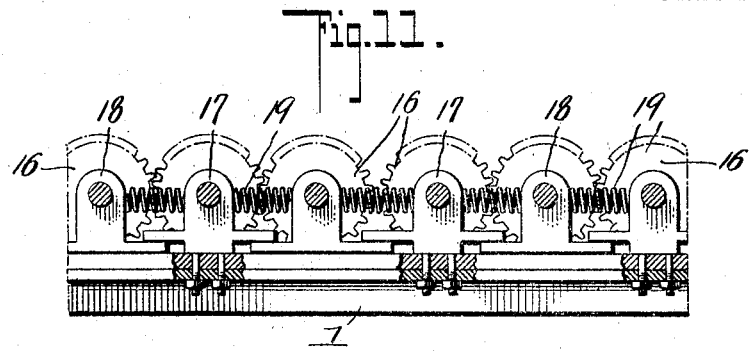
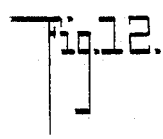
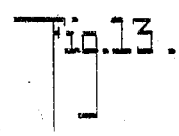
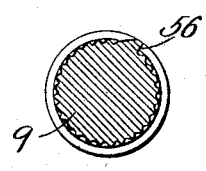
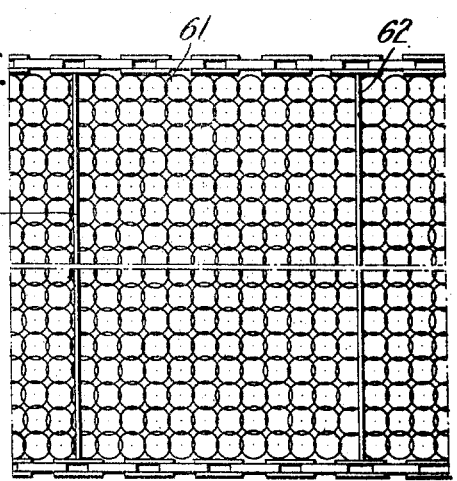
Witnesses
Inventors
W. C. Legg,
B. S. Legg, and
B. C. Dutton

UNITED STATES PATENT OFFICE.

WILBER C. LEGG, BYRON S. LEGG, AND BENJIMAN C. DUTTON, OF WINDFALL, INDIANA; SAID BYRON S. LEGG AND BENJIMAN C. DUTTON EACH ASSIGNOR OF EIGHT AND ONE-THIRD ONE-HUNDREDTHS OF THE WHOLE RIGHT TO SAID WILBER C. LEGG.

CORN SNAPPING AND HUSKING MACHINE.

1,002,530.            Specification of Letters Patent.      Patented Sept. 5, 1911.

Application filed November 27, 1907. Serial No. 404,165.

*To all whom it may concern:*

Be it known that we, WILBER C. LEGG, BYRON S. LEGG, and BENJIMAN C. DUTTON, citizens of the United States, residing at Windfall, in the county of Tipton and State of Indiana, have invented a new and useful Improvement in Corn Snapping and Husking Machines, of which the following is a specification.

This invention relates to a device for snapping ears of corn from the stalks, husking the ears and conveying the ears of corn to a wagon traveling by the side of the device, and to which the said device is connected in any suitable manner, and another object of the invention is a device of this kind in which any of the corn which may become shelled during the husking will be saved and also conveyed to the wagon.

The invention consists of a wheeled frame provided upon its front with two pairs of guide plates, each pair of plates being adapted to operate upon a row of corn so that ears are gathered from two rows at the same time. To the rear of each of said guide plates and the mechanism carried by them is arranged a pair of snapping rollers between which the stalks pass and which snaps the ears from the stalks and deposits the same upon husking rollers.

The invention consists also in providing endless chains having fingers which work between the husking rollers of each pair and conveys the ears of corn to an elevator carried at the rear of the device which receives the ears and shells the corn and conveys the same upwardly to the wagon.

The invention consists also in the novel features of construction hereinafter fully described, pointed out in the claims, and shown in the accompanying drawings, in which, Figure 1 is a top plan view. Fig. 2 is a side elevation. Fig. 3 is a front elevation. Fig. 4 is a rear elevation. Fig. 5 is a detail section on the line 5—5 of Fig. 6. Fig. 6 is a top plan view of one set of snapping rollers, looking from the line 6—6 of Fig. 5. Fig. 7 is a section on the line 7—7 of Fig. 6. Fig. 8 is a detail perspective view of a portion of the front of the frame. Fig. 9 is a detail sectional view showing the manner of locking an adjustable front fork. Fig. 10 is a detail view partly in section of a clutch. Fig. 11 is a detail view showing the manner of journaling the husking rollers. Fig. 12 is a cross-section through the body portion of an inner snapping roller. Fig. 13 is a similar section through an outer snapping roller. Fig. 14 is a detail sectional view showing the manner of journaling the lower end of a snapping roller. Fig. 15 is a plan view of a portion of a chain belt.

In these drawings 1 represents the frame of our corn gathering device which frame carries stub axles 2 upon which are mounted suitable supporting wheels 3 provided with adjusting mechanism 5 for raising and lowering the frame, which mechanism is now in use upon harvesters of the McCormick type. The wheels 3 are provided with sprocket wheels 6 which by means of suitable sprocket chains 6ª, and sprocket wheels 6ᵇ, transmit rotary motion to a main power shaft 7 upon which are mounted bevel gears 8. Upon the frame 1 and adjacent opposite sides are mounted forwardly and downwardly inclined snapping rollers 9 and 10. These snapping rollers will be described in detail hereafter.

The snapping rollers 9 are provided with gears 11 which mesh with a gear 12 carried by the snapping rollers 10, one of the snapping rollers 9 also carrying a bevel gear 13 which meshes with one of the bevel gears 8 of the power shaft 7, and each of these snapping rollers is provided also with a fly wheel 13ª. Arranged centrally upon the frame 1 and between the snapping rollers are a plurality of husking rollers 14 arranged in sets or pairs. While the number of these rollers may be varied with the size of the machine, we have illustrated a construction in which each set of husking rollers consists of two pairs. These rollers are corrugated or fluted and are arranged parallel to each other and slightly apart. At their rear ends the husking rollers are reduced and provided with gears 16, the gears of each pair meshing with each other. These husking rollers are journaled in fixed boxings 17 and in slidable boxings 18, one roller of each pair being journaled in a fixed boxing and one in a slidable boxing and the said boxings are also arranged in pairs, each pair consisting of a fixed and a slidable boxing which are connected by a spring 19. By means of this construction each pair of husking rollers has also a limited amount of movement away from each other so that they can adjust themselves as the work may require.

Upon the front of the device and in alinement with the snapping rollers are arranged in pairs slightly divergent guide plates 20 which are provided with inclined shafts 21 which carry upper and lower sprocket wheels 22 over which runs sprocket chains 23 which carry fingers 24 and which run over idlers 25 mounted at the ends of the guide plates 20. These fingers travel lengthwise of the guide plates and upon their inner adjacent faces travel rearwardly, thus picking up and conveying to the snapping rollers all stalks which may have fallen or may be bent over out of reach of the snapping rollers. Upon the lower end of each of the snapping rollers 10 is fixed a gear 26 which meshes with a gear 27 carried by the adjacent vertical shaft 21, so that the said shafts are driven by the outer or larger snapping rollers. Transverse front and rear shafts 28 are carried also by the upper portion of the frame 1, and upon these shafts are arranged sprocket wheels 29 over which run sprocket chains 30 which chains carry pins or spurs 31 which overhang the space between the husking rollers 14 of each pair. These pins travel rearwardly and thus convey the corn toward the rear of the frame and prevent the same from collecting at the forward end. The main power shaft 7 has a sprocket wheel 32 over which runs a chain 33 which also passes over the sprocket wheel 34 on the rear shaft 28. At the rear of the frame 1 is arranged a chute 35 in which works an endless chain 36, the chute and chain forming an elevator which receives the ears and conveys them upwardly and downwardly discharging them into the wagon.

One of each pair of the husking rollers is provided with a bevel pinion 37 which meshes with a bevel gear 38 on a power shaft 39. This shaft is provided with a sprocket wheel 40 over which runs a chain 41 which also runs over a sprocket wheel 42 on the shaft 7. The front portion of the frame between the guide plates 20 is supported by a suitable front wheel 43. This wheel 43 is mounted in a yoke 44 adjustably held in a bearing in the frame front bar by means of a yoke stem 45 perforated at 46 to receive a pin 47 held in place by a spring 48. The bearing is preferably a long sleeve 50 to which is pivoted a lever 49. The sprocket wheels 6ᵇ are loose on the shaft 7 and are locked to the shaft by the usual clutch mechanism as shown at 51.

Referring to the snapping rollers 9 and 10 the lower portions of these rollers are in the form of screws 54. This screw portion extends far enough to pass the stalks beyond the idlers 25 and insure positive feed of the stalks to the rollers. The extreme end portion of each snapping roller is smooth, thereby avoiding one objection made to devices employing such rollers, viz.: that they uproot the stalks. The intermediate main body portion of the rollers is fluted spirally. Up to this point both the rollers 9 and 10 are of like construction. But in addition to the fluting the rollers 10 are spirally grooved as at 55 while the rollers 9 are provided with spirally arranged blades 56. Both the grooves 55 and blades 56 are of a different pitch from the fluting. To aid in lifting fallen corn and especially stalks which have fallen at an angle to the roller, shafts 57 are carried to the front of the frame and extend downwardly, said shafts being arranged upon each side of the pairs of snapping rollers and at their lower ends are provided with spirally arranged blades 58 and adjacent said blades are arranged parallel octagonal rollers 59, said rollers being mounted in a plane above the guides 20. The blades 58 and rollers 59 aid materially in lifting up and carrying into proper position the fallen stalks. As some of the corn will become shelled in the husking operation we provide common means for discharging the husks at the front of the machine and for collecting the shelled corn and discharging the same into the elevator at the rear of the machine a solid bottom 60 is provided beneath the husking rollers and between the said rollers and over this body travels lengthwise of the machine an endless chain belt 61 which belt receives the husks and discharges them at the front end of the machine. The shelled corn drops through the links of the belt upon the bottom 60 and as the lower portion of the belt travels rearwardly transverse ribs 62 carried by the belt pass over the bottom 60 and convey the shelled corn to the elevator by means of which it is conveyed with the ears to the receiving wagon.

In order to drive the shafts 57 heretofore described they are provided at their upper ends with bevel gears 63 which mesh with gears 64 carried by shafts 65 which also carry bevel gears 66 meshing with bevel gears 67 formed integral with the sprockets over which run chains 69, which run also over sprocket wheel 70 on the power shaft 7.

The snapping rollers 9 and 10 are journaled at their lower ends in spring pressed bearings 71 so that they may be adjusted with reference to each other to suit the size of the stalks of corn for which they are working. The front of the frame 1 can be vertically adjusted by shifting the lever 49 which passes through the slot in the spring 48, thus withdrawing the pin 47 and permitting the yoke stem 45 to be readjusted in the sleeve 50 when the pin can be inserted in another perforation 46.

What we claim, is:

1. In a device of the kind described, snapping rollers arranged in pairs, said rollers extending upwardly and rearwardly, the lower portions of said rollers being screw shaped, the upper end portion of each roller being smooth and the intermediate portion being spirally fluted, one roller of each pair being also spirally grooved and the other roller of the pair being provided with a spirally arranged blade coöperating with the groove of the other roller of the pair, said blade and groove having a different pitch from the fluting.

2. A corn harvesting machine comprising two pairs of upwardly and rearwardly inclined snapping rollers arranged parallel to each other and spaced apart, means for feeding stalks between the rollers of each pair, one roller of each pair being spirally grooved, a spiral blade carried by the coöperating roller and registering with said groove, the said blades snapping the ears, the outer rollers being of greater diameter than the inner rollers, each pair of rollers directing the ear into the space between the two pairs of snapping rollers.

WILBER C. LEGG.
BYRON S. LEGG.
BENJIMAN C. DUTTON.

Witnesses:
JOHN F. MCCREARY,
T. W. LONGFELLOW.